(12) United States Patent
Lee

(10) Patent No.: US 9,493,899 B2
(45) Date of Patent: Nov. 15, 2016

(54) MOTOR USABLE WITH WASHING MACHINE AND WASHING MACHINE HAVING THE SAME

(71) Applicant: Samsung Electronics Co., Ltd., Suwon-si (KR)

(72) Inventor: Woon Yong Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/522,099

(22) Filed: Oct. 23, 2014

(65) Prior Publication Data

US 2015/0040618 A1  Feb. 12, 2015

Related U.S. Application Data

(63) Continuation of application No. 12/801,462, filed on Jun. 9, 2010, now Pat. No. 8,978,425.

(30) Foreign Application Priority Data

Aug. 17, 2009  (KR) .................. 10-2009-0075603

(51) Int. Cl.
*D06F 37/00* (2006.01)
*D06F 37/20* (2006.01)
*D06F 37/30* (2006.01)
*H02K 5/04* (2006.01)

(52) U.S. Cl.
CPC ............ *D06F 37/304* (2013.01); *D06F 37/00* (2013.01); *D06F 37/20* (2013.01); *D06F 37/206* (2013.01); *D06F 37/30* (2013.01); *H02K 5/04* (2013.01)

(58) Field of Classification Search
CPC ........ D06F 37/00; D06F 37/20; D06F 37/30; D06F 37/206; D06F 37/304; H02K 5/04
USPC .......................................................... 68/140
See application file for complete search history.

(56) References Cited

U.S. PATENT DOCUMENTS

| 4,804,905 A | 2/1989 | Ding et al. |
| 6,396,177 B1 | 5/2002 | Shin et al. |

(Continued)

FOREIGN PATENT DOCUMENTS

| CN | 1752328 | 3/2006 |
| CN | 1898433 | 1/2007 |

(Continued)

OTHER PUBLICATIONS

Chinese Office Action issued Jun. 9, 2014 in Chinese Patent Application No. 201010225266.8.

(Continued)

*Primary Examiner* — Michael Barr
*Assistant Examiner* — Levon J Shahinian
(74) *Attorney, Agent, or Firm* — Staas & Halsey LLP

(57) ABSTRACT

Disclosed herein are a motor usable with a washing machine to assure interchangeability of constituent elements thereof and a washing machine having the same. The motor includes a stator mounted to a tub of the washing machine, and a rotor to rotate a drum of the washing machine. The stator includes a stator core, first and second insulators arranged to cover the stator core, and a plurality of mounts to couple the stator to the tub. The plurality of mounts is selectively provided at one of the first insulator and the second insulator.

4 Claims, 11 Drawing Sheets

(56) References Cited

U.S. PATENT DOCUMENTS

| | | |
|---|---|---|
| 2005/0189838 A1 | 9/2005 | Lee |
| 2006/0059957 A1 | 3/2006 | Kim |
| 2007/0074542 A1 | 4/2007 | Kim |
| 2007/0113598 A1* | 5/2007 | Jun .................. D06F 37/304 68/140 |
| 2007/0205682 A1 | 9/2007 | Choi et al. |
| 2008/0042510 A1 | 2/2008 | Park |

FOREIGN PATENT DOCUMENTS

| | | |
|---|---|---|
| CN | 1950560 | 4/2007 |
| KR | 10-2005-0056677 | 6/2005 |
| KR | 10-2005-0056679 | 6/2005 |
| KR | 10-2005-0066541 | 6/2005 |
| KR | 10-2005-0122559 | 12/2005 |
| KR | 10-2006-0062182 | 6/2006 |
| KR | 10-2006-0084139 | 7/2006 |
| KR | 10-2006-0121002 | 11/2006 |
| KR | 10-2007-0049517 | 5/2007 |
| KR | 10-2009-0065936 | 6/2009 |

OTHER PUBLICATIONS

Korean Office Action issued Feb. 11, 2014 in Korean Patent Application No. 10-2009-0075603.
Chinese Office Action issued Nov. 5, 2013 in Chinese Patent Application No. 201010225266.8.
Korean Office Action issued Jul. 29, 2013 in Korean Application No. 10- 2009-0075603.
US Office Action issued Jul. 23, 2014 in U.S. Appl. No. 12/801,462.
US Office Action issued Dec. 26, 2013 in U.S. Appl. No. 12/801,462.
US Interview Summary issued Dec. 23, 2013 in U.S. Appl. No. 12/801,462.
US Office Action issued Sep. 5, 2013 in U.S. Appl. No. 12/801,462.
US Office Action issued Feb. 26, 2013 in U.S. Appl. No. 12/801,462.
U.S. Appl. No. 12/801,462, filed Jun. 9, 2010, Woon Yong Lee, Samsung Electronics Co., Ltd.
US Notice of Allowance issued Nov. 5, 2014 in U.S. Appl. No. 12/801,462.

* cited by examiner

MOTOR USABLE WITH WASHING MACHINE AND WASHING MACHINE HAVING THE SAME

CROSS-REFERENCE TO RELATED APPLICATIONS

This application is a continuation of U.S. patent application Ser. No. 12/801,462, filed on Jun. 9, 2010, which claims the benefit of Korean Patent Application No. 10-2009-0075603, filed on Aug. 17, 2009 in the Korean Intellectual Property Office, the disclosures of which are incorporated herein by reference.

BACKGROUND

1. Field

Embodiments relate to a motor to drive a drum of a washing machine.

2. Description of the Related Art

A washing machine washes clothing using electric power and generally includes a tub to store wash water therein, a drum rotatably installed in the tub, and a motor to drive the drum. When laundry and detergent-dissolved water are input into the drum and the drum is rotated by the motor, friction is generated between the laundry and the drum and between the laundry and the detergent-dissolved water, enabling removal of contaminants adhered to the laundry. Washing machines may be classified into an indirect drive type washing machine in which power of a motor is transmitted to a drum via a power transmission mechanism, such as a belt and a pulley, and a direct drive type washing machine in which power of a motor is directly transmitted to a shaft of a drum.

In the direct drive type washing machine, a motor includes a stator mounted to a tub, and a rotor arranged around the stator to electromagnetically interact with the stator.

SUMMARY

It is an aspect to provide a motor usable with a washing machine, which is improved to enable interchangeability of constituent elements thereof, and a washing machine having the same.

It is another aspect to provide a motor usable with a washing machine, which is improved to have a sufficient strength, and a washing machine having the same.

Additional aspects will be set forth in part in the description which follows and, in part, will be apparent from the description, or may be learned by practice of embodiments.

The foregoing and/or other aspects are achieved by providing a motor usable with a washing machine including a stator mounted to a tub of the washing machine and a rotor to rotate a drum of the washing machine, wherein the stator includes a stator core, a first insulator and a second insulator arranged to cover the stator core, and a plurality of mounts to couple the stator to the tub, the plurality of mounts being selectively provided at one of the first insulator and the second insulator.

The plurality of mounts may be provided at the first insulator, and the second insulator may be arranged between the tub and the first insulator when the stator is mounted to the tub.

The first insulator may include a first contact surface to come into contact with the tub when the stator is mounted to the tub.

The second insulator may include a second contact surface arranged on substantially the same plane as the first contact surface of the first insulator to come into contact with the tub when the stator is mounted to the tub.

Each of the plurality of mounts may include a coupling boss having a coupling hole configured to receive a fastening member inserted thereinto, a contact surface to come into contact with the tub when the stator is mounted to the tub, and a supporting surface formed at an opposite side of the contact surface to support the fastening member, and the coupling boss may take the form of a single member extending from the contact surface to the supporting surface.

Each of the plurality of mounts may further include a sleeve inserted into the coupling hole to reinforce the coupling boss, and the coupling boss may include a stopper to support one end of the sleeve so as to prevent the sleeve from protruding out of the coupling boss.

The stator may further include a fused portion formed between the first insulator and the second insulator to couple the second insulator to the first insulator.

The second insulator may include a plurality of cutout portions formed to correspond to the plurality of mounts, each cutout portion being configured to receive a part of the corresponding mount.

The plurality of mounts may be arranged in a circumferential direction of the first insulator, and the first insulator may include a circular reinforcing rib arranged inside the plurality of mounts in a radial direction of the first insulator to connect the plurality of mounts to one another.

The first insulator may include a plurality of first guide bosses arranged in a circumferential direction of the first insulator and configured to protrude toward the second insulator, and the second insulator may include a plurality of second guide bosses arranged to correspond to the plurality of first guide bosses and configured to protrude toward the first insulator so as to come into contact with the plurality of first guide bosses.

The rotor may include a rotor frame having a bottom and a sidewall protruding from a rim of the bottom, at least one reinforcing structure protruding from the bottom to reinforce the bottom, and an injection molded part injection molded at the bottom to cover inner and outer surfaces of the at least one reinforcing structure.

The at least one reinforcing structure may include a plurality of beads protruding from the bottom to extend in a radial direction of the rotor frame, the beads being arranged in a circumferential direction of the rotor frame, and the injection molded part may include a plurality of cooling blades arranged to correspond to the plurality of beads respectively and configured to cover inner surfaces of the respective beads.

Each of the plurality of beads may have at least one hole to allow molten resin to pass through the bottom of the rotor frame during injection molding of the injection molded part.

The at least one reinforcing structure may include a center reinforcement protruding downward from the center of the bottom, and the injection molded part may cover inner and outer surfaces of the center reinforcement.

The rotor may further include a magnet circumferentially arranged at an inner surface of the sidewall, and a back-yoke ring coupled to an outer surface of the sidewall at a position corresponding to the magnet, and the back-yoke ring may include a plurality of unit yokes arranged in a circumferential direction of the rotor frame and connected to one another so as to extend a radius of the back-yoke ring.

The sidewall of the rotor frame may include a bent portion formed in a radius extension direction of the rotor frame, and at least one hole formed in the bent portion.

The foregoing and/or other aspects may also be achieved by providing a motor usable with a washing machine, the motor including a stator mounted to a tub of the washing machine, wherein the stator includes a stator core, a first insulator arranged below the stator core and including a core receptacle to receive at least a part of the stator core and a plurality of coupling bosses arranged in a circumferential direction of the stator, the plurality of coupling bosses extending to the tub and being supported by the tub when the stator is mounted to the tub, and a second insulator arranged between the tub and the first insulator to face the first insulator when the stator is mounted to the tub.

The first insulator may further include at least one reinforcing rib formed in the circumferential direction of the stator and arranged inside the core receptacle in a radial direction of the stator, and the at least one reinforcing rib may include a fused portion to couple the first insulator and the second insulator to each other.

The first insulator may further include a plurality of reinforcing ribs formed in the circumferential direction of the stator and arranged inside the core receptacle in a radial direction of the stator, and the plurality of coupling bosses may be arranged between the plurality of reinforcing ribs.

The second insulator may include a plurality of cutout portions corresponding to the plurality of coupling bosses, and the plurality of coupling bosses may extend to the tub through the plurality of cutout portions.

The foregoing and/or other aspects are also achieved by providing a washing machine including a tub including a rear wall, a drum placed in the tub, and a motor mounted to the rear wall of the tub and serving to drive the drum, wherein the motor includes a stator including an upper insulator arranged adjacent to the rear wall of the tub, a lower insulator arranged at an opposite side of the upper insulator about the tub and having a plurality of mounts extending to the rear wall of the tub in an axial direction of the motor so as to be coupled to the rear wall of the tub, and a stator core received between the upper insulator and the lower insulator, and a rotor arranged around the stator to electromagnetically interact with the stator.

The plurality of mounts may include a plurality of coupling bosses respectively, each coupling boss having a coupling hole configured to receive a fastening member inserted thereinto, a contact surface to come into contact with the rear wall of the tub, and a supporting surface formed at an opposite side of the contact surface to support the fastening member.

The first insulator may include circular reinforcing ribs arranged respectively at inner and outer sides of the plurality of coupling bosses in a radial direction of the stator, and a plurality of guide bosses protruding from one of the reinforcing ribs toward the second insulator.

The tub may further include a plurality of positioning bosses protruding from the rear wall of the tub, the first insulator may include a plurality of first positioning holes to receive the plurality of positioning bosses, and the second insulator may include a plurality of second positioning holes through which the plurality of positioning bosses penetrate.

The rotor may include a rotor frame having a bottom and a sidewall protruding from a rim of the bottom, a center reinforcement protruding from the center of the bottom of the rotor frame, a plurality of beads protruding from the bottom of the rotor frame to extend in a radial direction of the rotor frame, each bead having at least one hole, and an injection molded part injection molded at the bottom of the rotor frame to cover inner and outer surfaces of the center reinforcement and inner and outer surfaces of the plurality of beads.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
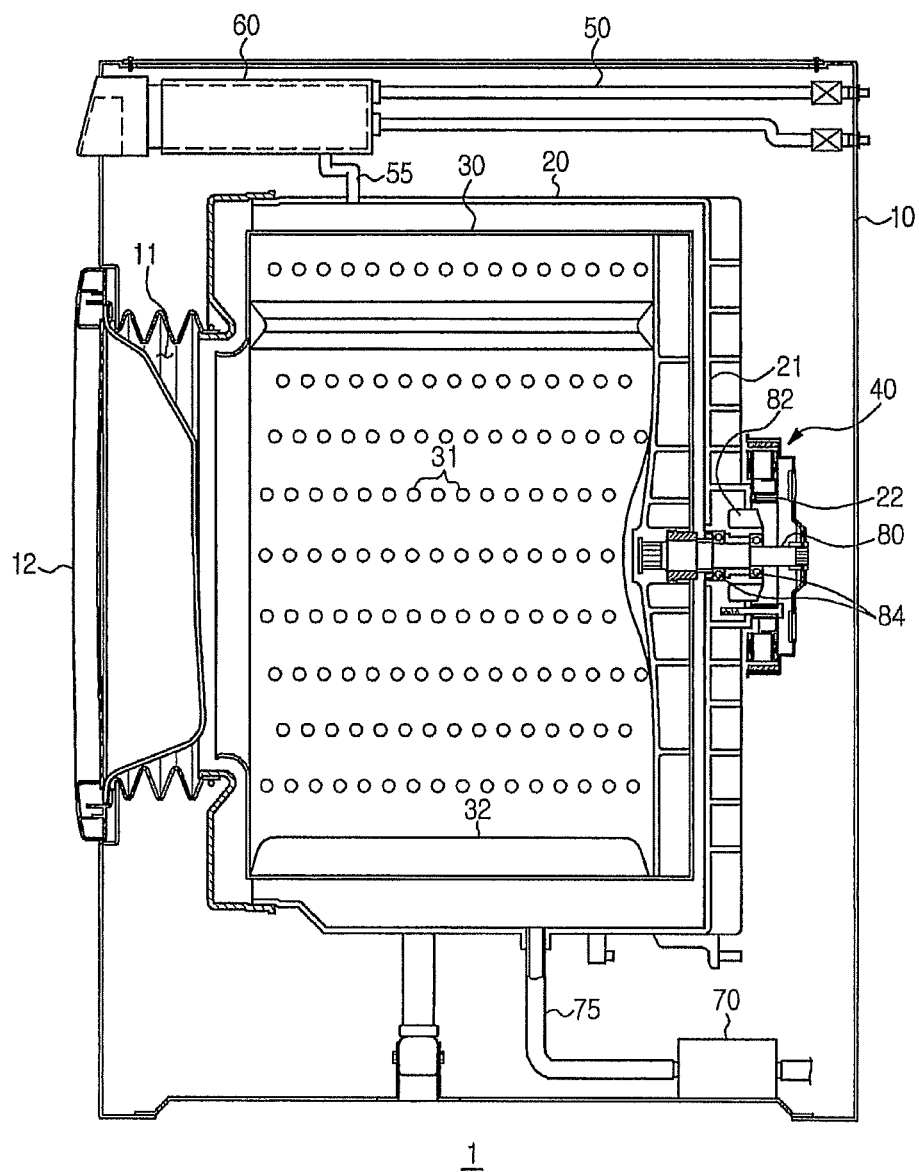
FIG. 1 is a view illustrating a washing machine according to an embodiment.

Reference will now be made in detail to the embodiments, examples of which are illustrated in the accompanying drawings, wherein like reference numerals refer to like elements throughout. FIG. 1 is a view illustrating a washing machine according to the embodiment.

As shown in FIG. 1, the washing machine 1 includes a cabinet 10 defining an external appearance of the washing machine 1, a tub 20 placed in the cabinet 10, a drum 30 rotatably placed in the tub 20, and a motor 40 to drive the drum 30.

The cabinet 10 is formed in a front surface thereof with an entrance opening 11 to allow a user to put laundry into the drum 30. The entrance opening 11 is opened or closed by a door 12 that is coupled to the front surface of the cabinet 10.

A water supply pipe 50 is provided above the tub 20 to supply wash water into the tub 20. One end of the water supply pipe 50 is connected to an external water source (not shown) and the other end is connected to a detergent supply device 60. The detergent supply device 60 is connected to the tub 20 via a connection pipe 55. Water supplied via the water supply pipe 50 is mixed with detergents in the detergent supply device 60 and then, the resulting detergent dissolved water is supplied into the tub 20.

A water drain pump 70 and a water drain pipe 75 are provided below the tub 20 to discharge the water inside the tub 20 out of the cabinet 10.

The drum 30 has a plurality of holes 31 formed in a periphery thereof for passage of wash water. A plurality of lifters 32 is arranged at an inner peripheral surface of the drum 30 to raise and drop laundry during rotation of the drum 30.

A drive shaft 80 is arranged between the drum 30 and the motor 40. The drive shaft 80 transmits rotation force of the motor 40 to the drum 30. One end of the drive shaft 80 is connected to the drum 30 and the other end extends outward from a rear wall 21 of the tub 20.

A bearing housing 82 is mounted to the rear wall 21 of the tub 20, to rotatably support the drive shaft 80. The bearing housing 82 may be made of an aluminum alloy, and may be inserted into the rear wall 21 during injection molding of the tub 20. Bearings 84 are interposed between the bearing housing 82 and the drive shaft 80, to assure smooth rotation of the drive shaft 80.

Figure 2:
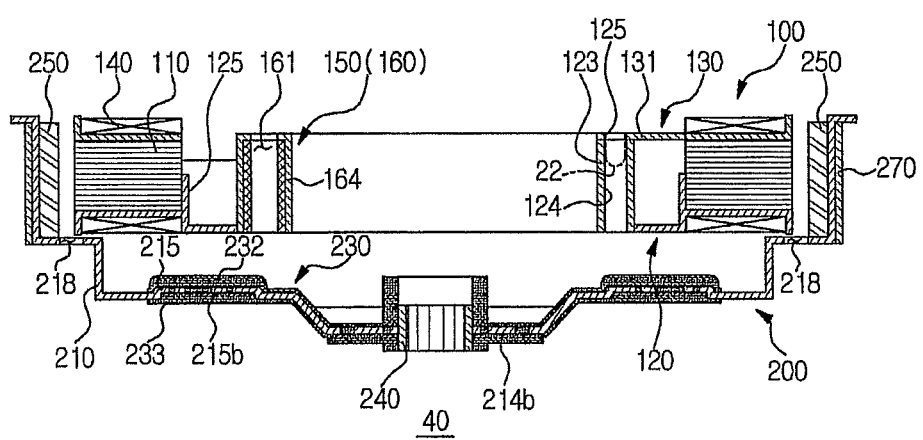
FIGS. 2 and 3 are respectively a sectional view and a perspective view illustrating a configuration of a motor according to the embodiment.
Figure 3:
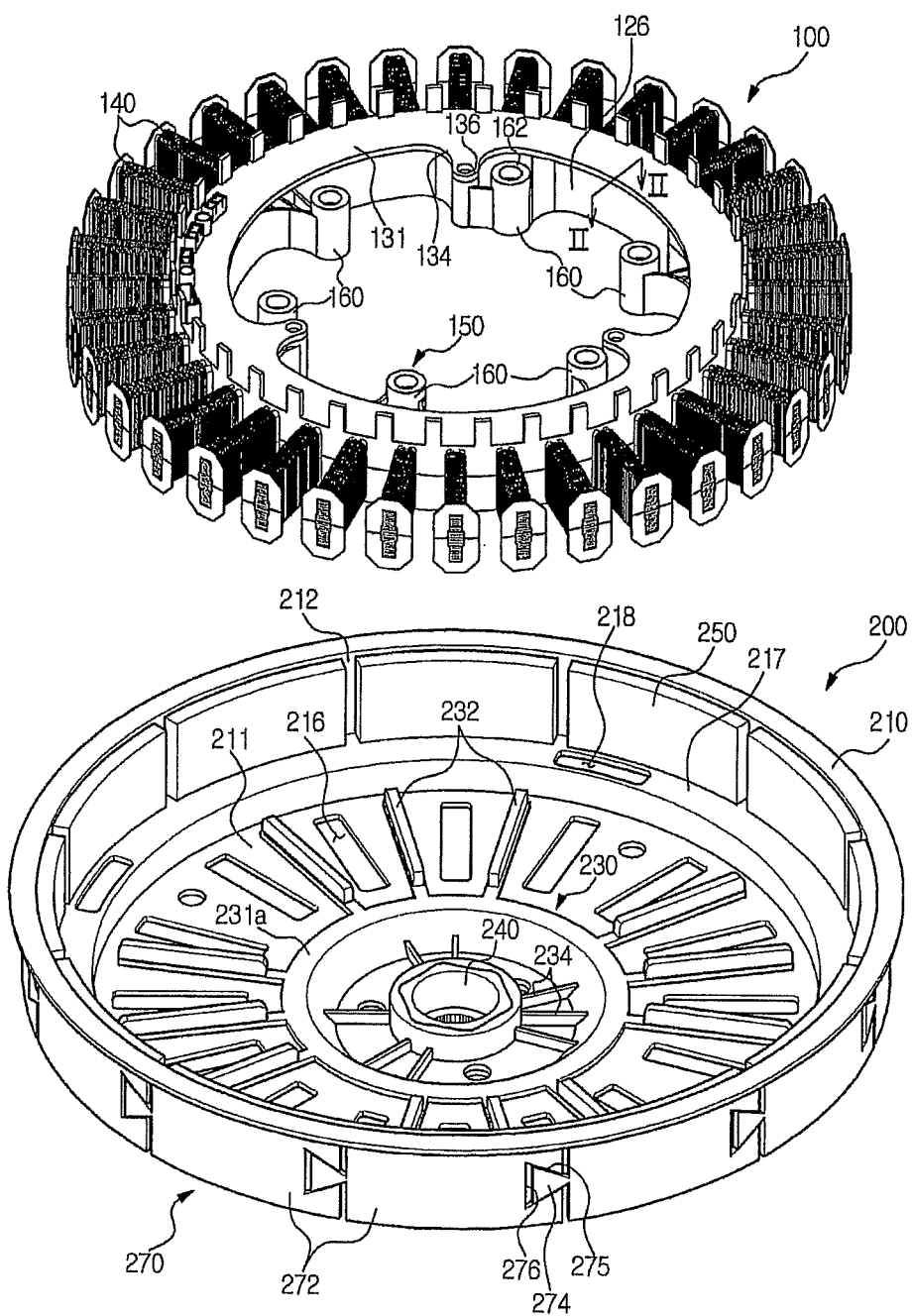
Figure 4:
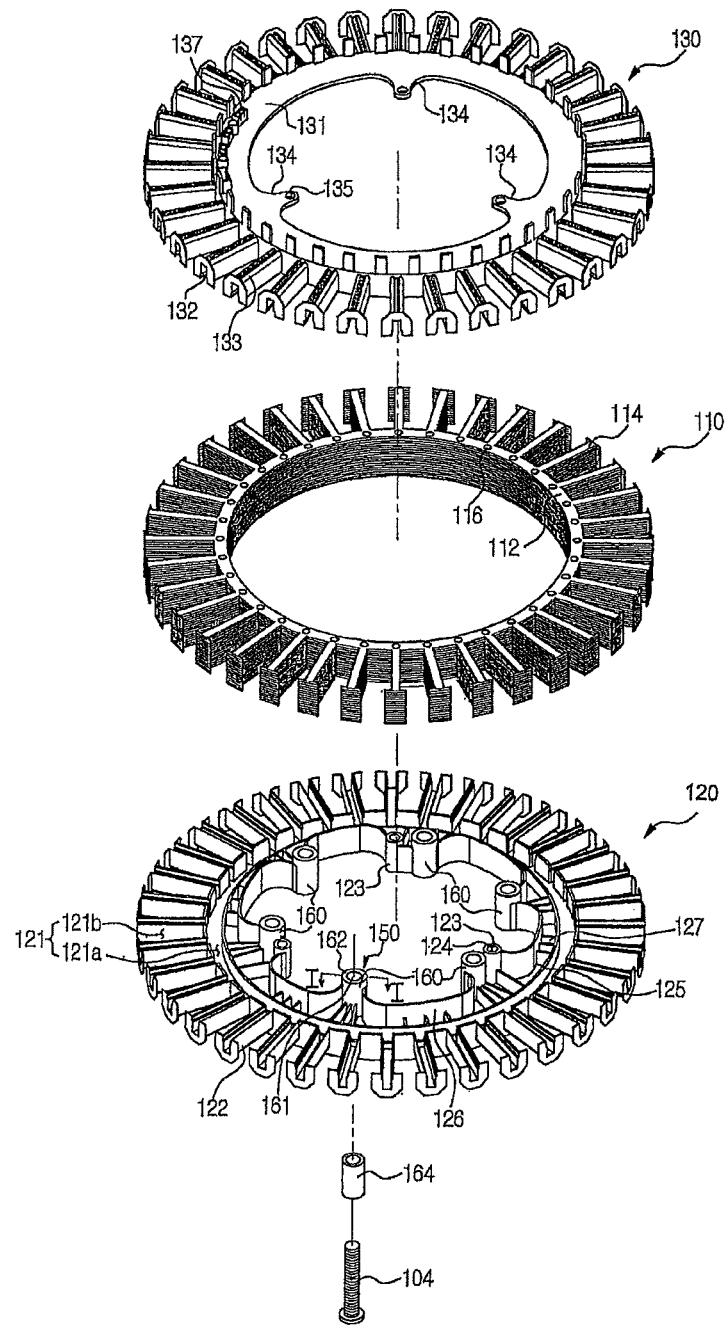
FIG. 4 is an exploded perspective view of a stator shown in FIG. 3.

FIGS. 2 and 3 are respectively a sectional view and a perspective view illustrating a configuration of the motor according to the embodiment, and FIG. 4 is an exploded perspective view of a stator shown in FIG. 3. In FIG. 3, a stator and a rotor of the motor are separated from each other.

As shown in FIGS. 1 to 4, the motor 40 is positioned at the outside of the tub 20 and applies power to the drum 30 so as to rotate the drum 30 in opposite directions. The motor 40 includes a stator 100 mounted to the rear wall 21 of the tub 20 and a rotor 200 arranged around the stator 100 so as to be rotated via electromagnetic interaction with the stator 100.

The stator 100 includes a stator core 110, a first insulator 120, a second insulator 130, a coil 140, and a plurality of mounts 150 to mount the stator 100 to the tub 20.

The stator core 110 includes an annular base 112 and teeth 114 arranged around an outer periphery of the base 112 to protrude outward in a radial direction of the stator 100. In one example, the stator core 110 may be formed by stacking pressed iron plates one above another to form divided unit cores and thereafter, connecting the unit cores to one another in a circumferential direction. In another example, the stator core 110 may be formed by spirally rotating and stacking a band-shaped iron plate having the base 112 and the teeth 114.

The base 112 of the stator core 110 has insertion holes 116 arranged in a circumferential direction thereof. Fastening members, such as pins, rivets, etc., are inserted through the insertion holes 116 to couple respective layers of the stator core 110.

The first insulator 120 and the second insulator 130 are made of an electrically insulating material and are arranged below and above the stator core 110 to cover the stator core 110. When the stator 100 is mounted to the tub 20, the second insulator 130 is arranged close to the rear wall 21 of the tub 20 and the first insulator 120 is arranged at an opposite side of the second insulator 130 with the stator core 110 interposed between the first and second insulators 120 and 130.

The first insulator 120 includes a core receptacle 121 to receive the stator core 110. The core receptacle 121 includes an annular base receptacle 121a corresponding to the base 112 of the stator core 110, and a first teeth receptacle 121b corresponding to the teeth 114 of the stator core 110.

The second insulator 130 includes a cover 131 placed above the base 112 of the stator core 110, and a second teeth receptacle 132 corresponding to the teeth 114 of the stator core 110.

When the first insulator 120 and the second insulator 130 are coupled to each other, the stator core 110 is received in a space defined by the base receptacle 121a, the first teeth receptacle 121b, the second teeth receptacle 132, and the cover 131.

The first insulator 120 and the second insulator 130 have first coil supports 122 and second coil supports 133 respectively. Each of the first coil supports 122 and a corresponding one of the second coil supports 133 constitute a single coil support when the first insulator 120 and the second insulator 130 are coupled to each other, and the coil 140 is wound on each coil support.

The plurality of mounts 150 is selectively provided at any one of the first insulator 120 and the second insulator 130. Although FIG. 4 illustrates the plurality of mounts 150 as being provided at the first insulator 120, the plurality of mounts 150 may be provided at the second insulator in another embodiment.

Providing the mounts 150 only at one of the first insulator 120 and the second insulator 130 may require only one of the first insulator 120 and the second insulator 130 to be changed when it is necessary to change specifications of the motor 40. This may reduce costs required to redesign and produce constituent elements of the motor 40 due to change of specifications of the motor 40.

For example, if the mounts are formed at both the first insulator and the second insulator, changing a height of the stator core may require change of both the first insulator and the second insulator. However, when the mounts 150 are formed only at the first insulator 120 as shown in FIG. 4, it is necessary to redesign only the first insulator 120. In this case, the second insulator 130 may be used without any change.

In addition, since providing the mounts 150 only at a single insulator may advantageously reduce a dimensional error of the mounts 150 as compared to the case where the mounts are formed at the two insulators respectively, it may be possible to more stably mount the stator 100 to the tub 20.

Figure 5:
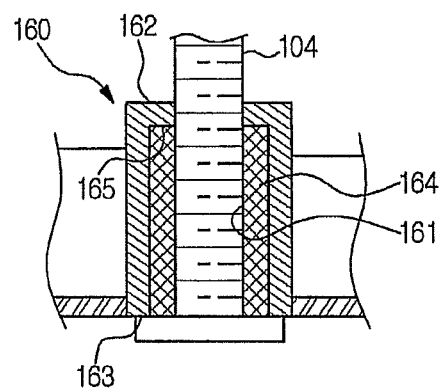
FIG. 5 is a sectional view taken along the line I-I of FIG. 4.

FIG. 5 is a sectional view taken along the line I-I of FIG. 4. As shown in FIGS. 4 and 5, the mounts 150 are located inside the core receptacle 121 in a radial direction of the first insulator 120, and are arranged in a circumferential direction of the first insulator 120. Although FIG. 4 illustrates an example of providing six mounts 150, the number of the mounts 150 may be changed.

The mounts 150 may be formed of coupling bosses 160, each of which has a coupling hole 161 to enable insertion of a fastening member 104 such as a bolt, etc. Each of the coupling bosses 160 takes the form of a single member extending to the rear wall 21 of the tub 20 in an axial direction of the motor 40. When the stator 100 is fixed to the tub 20 by the fastening member 104, one side of the coupling boss 160 is supported by the rear wall 21 of the tub 20.

Each of the coupling bosses 160 includes a contact surface 162 to come into contact with the rear wall 21 of the tub 20 when the stator 100 is mounted to the tub 20, and a supporting surface 163 formed at an opposite side of the contact surface 162 to support the fastening member 104. The coupling boss 160 may take the form of a single member extending from the supporting surface 163 to the contact surface 162.

A sleeve 164 may be inserted into the coupling hole 161 of the coupling boss 160. The sleeve 164 may be made of metal. The sleeve 162 serves to reinforce the coupling boss 160, preventing damage to the coupling boss 160 during insertion of the fastening member 104 or due to vibration transmitted from the tub 20 during operation of the washing machine.

As shown in FIG. 5, the coupling boss 160 includes a stopper 165 to support one end of the sleeve 164 so as to prevent the sleeve 164 received in the coupling boss 160 from protruding out of the coupling boss 160. The stopper 165 may be a stepped portion protruding inward of the coupling hole 161. The stopper 165 prevents the sleeve 164 from coming into contact with the tub 20, thereby preventing collision noise between the sleeve 164 and the tub 20 when the tub 20 vibrates during operation of the washing machine.

As shown in FIG. 4, the first insulator 120 has positioning bosses 123 arranged in the circumferential direction of the first insulator 120. Each of the positioning bosses 123 internally defines a first positioning hole 124.

Each of the positioning bosses 123 extends in the axial direction of the motor 40 and has a height lower than that of the coupling bosses 160. Accordingly, an upper surface of the positioning boss 123 and the contact surface 162 of the coupling boss 160 are stepped from each other.

The first insulator 120 includes a supporting rib 125 circumferentially provided inside the core receptacle 121, and a reinforcing rib 126 circumferentially provided inside the supporting rib 125.

The supporting rib 125 supports an inner surface of the stator core 110 received in the core receptacle 121. The reinforcing rib 126 increases a structural strength of the first insulator 120 and connects the coupling bosses 160 to one another so as to prevent a variation in relative positions of the coupling bosses 160.

Connection ribs 127 are arranged between the supporting rib 125 and the reinforcing rib 126. The connection ribs 127 connect the reinforcing rib 126, the coupling bosses 160 and the positioning bosses 123 to the supporting rib 125, enhancing the strength of the first insulator 120 and preventing deformation of the first insulator 120.

The second insulator 130 has an annular cover 131. The cover 131 is configured to cover the base receptacle 121a of the first insulator 120, the supporting rib 125, and a part of the reinforcing rib 126. The cover 131 has projections 134 radially protruding inward of the second insulator 130.

The respective projections 134 are arranged above the positioning bosses 123 of the first insulator 120 when the first insulator 120 and the second insulator 130 are coupled to each other. A second positioning hole 135 is formed in an end of each of the projections 134 to correspond to the first positioning hole 124 of the first insulator 120.

Positioning bosses 22 (see FIGS. 1 and 2) are provided at the rear wall 21 of the tub 20 to allow the stator 100 to be mounted at an accurate position. The positioning bosses 22 are arranged to correspond to the first positioning holes 124 and the second positioning holes 135 of the stator 100. When the stator 100 is mounted to the tub 20, the positioning bosses 22 of the tub 20 penetrate through the second positioning holes 135 of the second insulator 130 and are received in the first positioning holes 124 of the first insulator 120.

As shown in FIG. 3, each of the projections 134 has a contact surface 136, which is placed on substantially the same plane as the contact surface 162 of the coupling boss 160. The contact surface 136 of the projection 134 comes into contact with the rear wall 21 of the tub 20 when the stator 100 is mounted to the tub 20.

The second insulator 130 is provided with a power source connector 137 to supply power to the coil 140 of the stator 100.

Figure 6:
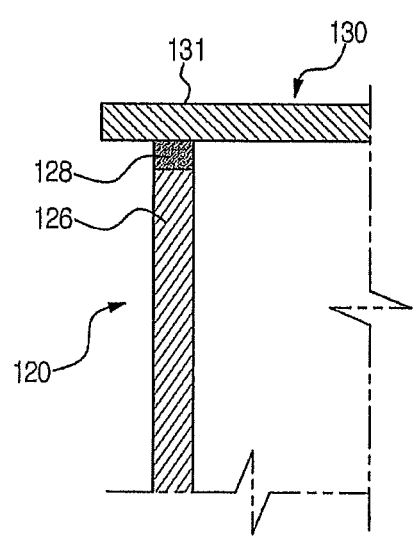
FIG. 6 is a sectional view taken along the line II-II of FIG. 3.

FIG. 6 is a sectional view taken along the line II-II of FIG. 3. As shown in FIG. 6, a fused portion 128 may be provided between the first insulator 120 and the second insulator 130 to fix the second insulator 130 to the first insulator 120. The fused portion 128 may be formed by melting a part of the reinforcing rib 126 of the first insulator 120, which comes into contact with the cover 131 of the second insulator 130, by use of an ultrasonic fusing machine.

Figure 7:
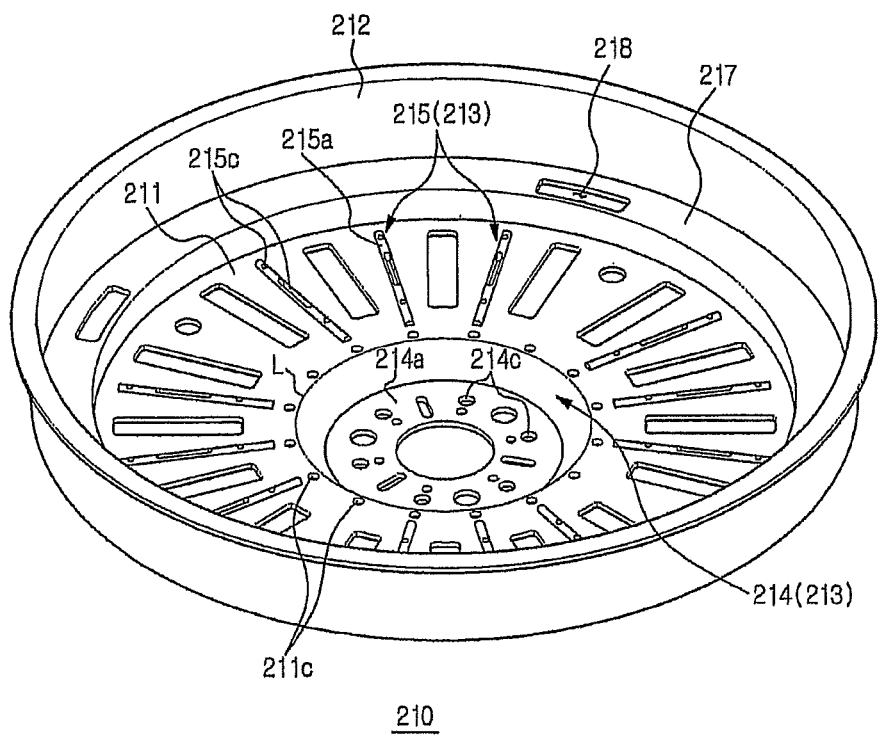
FIG. 7 is a perspective view illustrating a rotor frame included in a rotor shown in FIG. 3.
Figure 8:
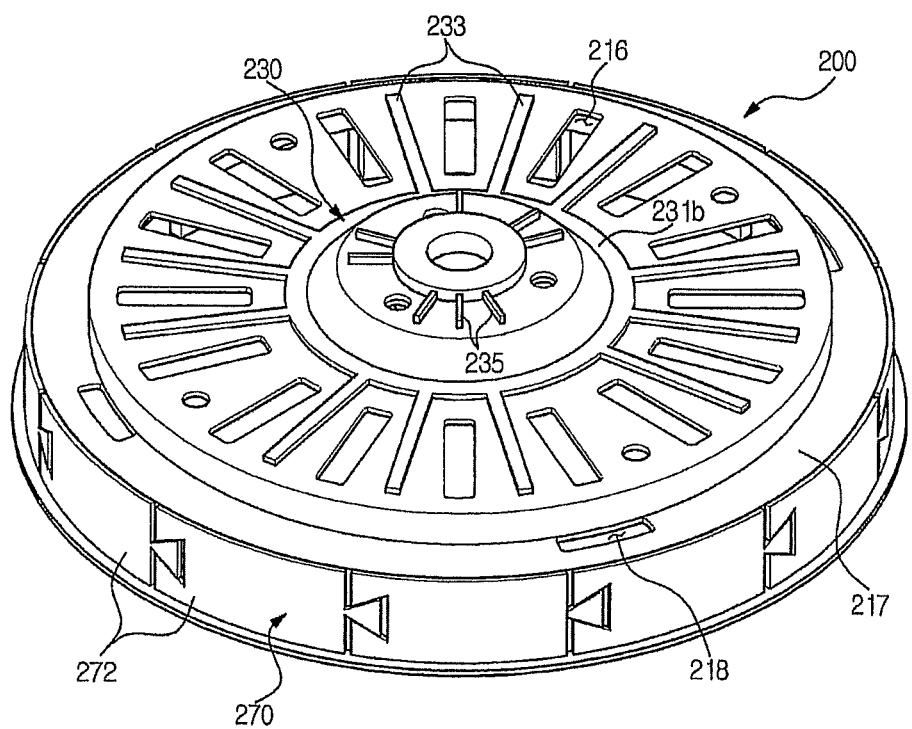
FIG. 8 is a rear perspective view of the rotor included in the motor according to the embodiment.

FIG. 7 is a perspective view illustrating a rotor frame included in the rotor shown in FIG. 3, and FIG. 8 is a rear perspective view of the rotor included in the motor according to the embodiment.

As shown in FIGS. 2, 3, 7 and 8, the rotor 200 includes a rotor frame 210 and an injection molded part 230 formed at the rotor frame 210.

The rotor frame 210 includes a bottom 211 and a sidewall 212 protruding from a rim of the bottom 211 and is arranged to surround the periphery of the stator 100. The rotor frame 210 may be made of a magnetic substance, and may have a thickness of 1.6 mm or less for enhanced productivity and reduced material costs.

The bottom 211 of the rotor frame 210 is formed with at least one reinforcing structure 213 to increase the strength of the rotor frame 210. The at least one reinforcing structure 213 includes a center reinforcement 214 protruding downward from near the center of the bottom 211, and a plurality of beads 215 protruding from the bottom 211 at positions at the outside of the center reinforcement 214.

The beads 215 extend in a radial direction of the rotor frame 210 and are arranged in a circumferential direction of the rotor frame 210.

The injection molded part 230 is injection molded at the bottom 211 of the rotor frame 210 and is integrally formed with the rotor frame 210. A serration member 240 is inserted into the center of the injection molded part 230. The serration member 240 is made of metal, such as iron, aluminum alloy, etc., and is coupled to an end of the drive shaft 80 extending outward from the tub 20.

The injection molded part 230 is configured to cover the center reinforcement 214 and beads 215 of the rotor frame 210 and serves to further increase the strength of the rotor frame 210. Covering the reinforcing structure 213 of the rotor frame 210 with the injection molded part 230 may prevent deformation of the rotor frame 210 even if the rotor frame 210 is thin.

The injection molded part 230 is configured to cover an inner surface 214a and an outer surface 214b of the center reinforcement 214 and an inner surface 215a and an outer surface 215b of each of the beads 215. Some portions 231a and 231b of the injection molded part 230 are configured to cover inner and outer surfaces of a portion of the bottom 211 of the rotor frame 210 around the center reinforcement 214. This configuration serves to prevent deformation around a bending line L that is created on the bottom 211 of the rotor frame 210 upon formation of the center reinforcement 214.

As shown in FIG. 7, the center reinforcement 214 and each of the beads 215 have holes 214c and 215c to allow melted resin to surround the inner and outer surfaces of the center reinforcement 214 and the inner and outer surfaces of the beads 215 by passing through the bottom 211 of the rotor frame 210 during injection molding of the injection molded part 230. In addition, holes 211c for passage of the melted resin are formed in the bottom 211 of the rotor frame 210 around the center reinforcement 214.

Air inlets 216 are formed in the bottom 211 of the rotor frame 210 at positions between the neighboring beads 215 to allow outside air to enter the rotor frame 210 during rotation of the rotor 200.

As shown in FIGS. 2 and 3, the injection molded part 230 includes cooling blades 232 protruding inward of the rotor frame 210 at positions corresponding to the respective beads 215. The cooling blades 232 create an air stream within the rotor frame 210 during rotation of the rotor 200, so as to cool interior elements of the motor 40.

Arranging the cooling blades 232 at positions corresponding to the beads 215 of the rotor frame 210 may be advantageous in view of space utilization. Specifically, if the beads 215 for reinforcement and the blades 232 for cooling are separately arranged at the bottom 211 of the rotor frame 210, it may be impossible to provide a sufficient number of beads, cooling blades, and air inlets within a limited area of the bottom 211 of the rotor frame 210. However, in the embodiment, by arranging the cooling blades 232 at positions corresponding to the beads 215 of the rotor frame 210, a sufficient number of beads, cooling blades, and air inlets may be effectively arranged.

As shown in FIGS. 7 and 8, the injection molded part 230 includes first rotor reinforcing ribs 233 protruding outward of the rotor frame 210 at positions corresponding to the respective beads 215. The first rotor reinforcing ribs 233 serve to further increase the strength of the rotor frame 210, in cooperation with the beads 215 of the rotor frame 210.

The injection molded part 230 includes second rotor reinforcing ribs 234 and third rotor reinforcing ribs 235 protruding respectively inward and outward of the rotor frame 210 within a range of the center reinforcement 214. The second rotor reinforcing ribs 234 and the third rotor reinforcing ribs 235 extend in the radial direction of the rotor frame 210 and act to increase the strength of the injection molded part 230 and the rotor frame 210.

The sidewall 212 of the rotor frame 210 has a bent portion 217 formed in a radius extension direction of the rotor frame 210. Magnets 250 are circumferentially attached to an inner surface of the sidewall 212 at an upper surface of the bent portion 217. The magnets 250 are arranged to face the coil 140 of the stator 100 with a predetermined distance therebetween, so as to electromagnetically interact with the stator 100.

Holes 218 are circumferentially arranged in the bent portion 217 of the sidewall 212. When assembling the motor 40 to the tub 20, an operator may easily observe whether an appropriate distance is maintained between the stator 100 and the magnets 250 through the holes 218 of the bent portion 217.

A back-yoke ring 270 is coupled to an outer surface of the sidewall 212 of the rotor frame 210. The back-yoke ring 270 serves not only to improve the performance of the motor 40 by preventing leakage of a magnetic field of the magnet 250, but also to reinforce the sidewall 212 of the rotor frame 210.

As shown in FIGS. 3 and 8, the back-yoke ring 270 may include a plurality of unit yokes 272 arranged in the circumferential direction of the rotor frame 210. Each of the unit yokes 272 has a coupling protrusion 274 formed at one end thereof and a coupling recess 276 formed in the other end thereof. The coupling protrusion 274 has slopes 275 to provide the coupling protrusion 274 with a gradually increasing cross section in a protruding direction of the protrusion 274. The coupling recess 276 has a shape corresponding to that of the coupling protrusion 274.

The coupling protrusion 274 of any one of the unit yokes 272 is engaged with the coupling recess 276 of the neighboring unit yoke 272. The unit yokes 272 connected with one another generally have a ring shape and are press-fitted to the outer surface of the sidewall 212. When the back-yoke ring 270 is press-fitted to the sidewall 212, distances between the unit yokes 272 slightly increase, causing a radius of the back-yoke ring 270 to be increased. This assures easier press-fitting of the back-yoke ring 270. In addition, as the radius of the back-yoke ring 270 gradually increases, the coupling protrusions 274 of the unit yokes 272 may be more strongly engaged with the coupling recesses 276, allowing the back-yoke ring 270 to be firmly fixed to the sidewall 212.

Figure 9:
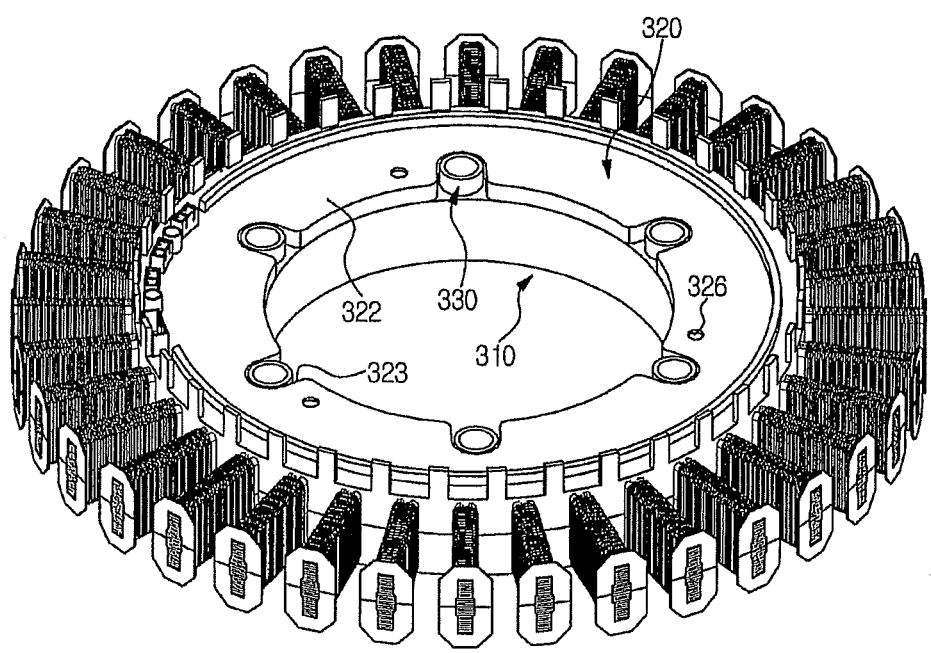
FIG. 9 is a perspective view of a stator included in a motor according to another embodiment.
Figure 10:
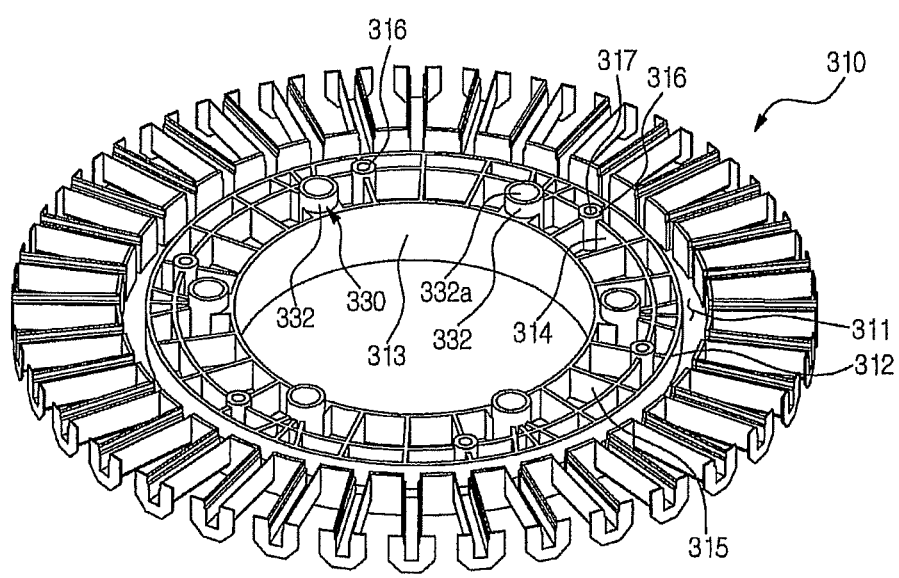
FIG. 10 is a perspective view illustrating a lower insulator included in the stator shown in FIG. 9.
Figure 11:
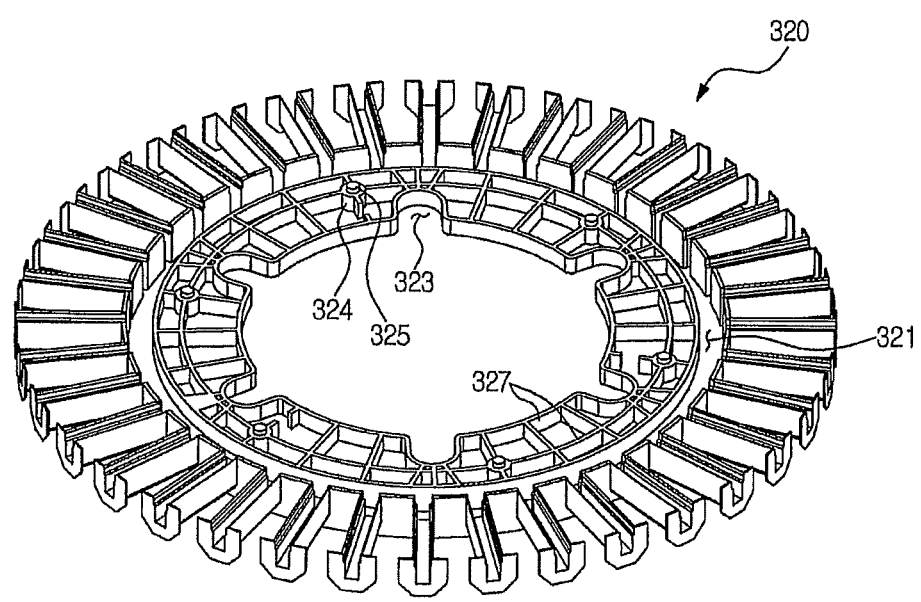
FIG. 11 is a perspective view illustrating a rear surface of an upper insulator included in the stator shown in FIG. 9.

FIG. 9 is a perspective view of a stator included in a motor according to another embodiment, FIG. 10 is a perspective view illustrating a lower insulator included in the stator shown in FIG. 9, and FIG. 11 is a perspective view illustrating a rear surface of an upper insulator included in the stator shown in FIG. 9.

As shown in FIGS. 9 to 11, the stator 300 includes a first insulator 310 and a second insulator 320 arranged respectively below and above a stator core (not shown) so that the stator core is interposed between the first insulator 310 and the second insulator 320. One of the first insulator 310 and the second insulator 320 is selectively provided with a plurality of mounts 330 to mount the stator 300 to the tub of the washing machine. Although FIG. 10 illustrates the plurality of mounts 330 as being provided at the first insulator 310, the plurality of mounts 330 may be provided at the second insulator 320 in another embodiment.

The first insulator 310 includes a first core receptacle 311 to receive a lower portion of the stator core (not shown), a supporting rib 312 to support an inner surface of the stator core received in the first core receptacle 311, and circular reinforcing ribs 313 and 314 arranged inside the first core receptacle 311 to increase a strength of the first insulator 310.

The mounts 330 of the first insulator 310 are arranged between the circular reinforcing ribs 313 and 314. At least one of the reinforcing ribs 313 is arranged inside the mounts 330 to connect the mounts 330 to one another. The supporting rib 312 and the reinforcing ribs 313 and 314 of the first insulator 310 may be connected to each other by radially extending connection ribs 315. This reinforcing configuration may effectively prevent bending or distortion of the first insulator 310.

The mounts 330 may be formed of coupling bosses 332, each of which has a coupling hole 332a to enable insertion of a fastening member (not shown), such as a bolt, etc. Each of the coupling bosses 332 takes the form of a single member extending to the rear wall 21 of the tub 20 when the stator 300 is fixed to the tub 20 (see FIG. 1). Once the stator 300 is fixed to the tub 20, one side of the coupling boss 332 is supported by the rear wall 21 of the tub 20 by the fastening member (not shown).

The first insulator 310 includes first guide bosses 316 arranged in a circumferential direction of the first insulator 310 and configured to protrude toward the second insulator 320. Each of the first guide bosses 316 has a guide hole 317.

The second insulator 320 includes a second core receptacle 321 to receive an upper portion of the stator core, and a cover 322 to cover the first insulator 310 from the upper side thereof. The cover 322 is configured to cover the supporting rib 312 and the circular reinforcing ribs 313 and 314 of the first insulator 310.

The cover 322 has cutout portions 323 formed at positions corresponding to the coupling bosses 332 of the first insulator 310. When the second insulator 320 is coupled to the first insulator 310, each of the cutout portions 323 receives an upper portion of the corresponding coupling boss 332. The coupling boss 332 of the first insulator 310 may extend to the tub 20 by passing through the cutout portion 323 formed in the cover 322 of the second insulator 320.

Second guide bosses 324 are formed at a rear surface of the cover 322 to correspond to the first guide bosses 316 of the first insulator 310. The second guide bosses 324 have guide protrusions 325 protruding toward the first insulator 310.

When the second insulator 320 is coupled to the first insulator 310, the guide protrusions 325 of the second insulator 320 are inserted into the guide holes 317 of the first insulator 310. Thereby, lower surfaces of the second guide bosses 324 come into contact with upper surfaces of the first guide bosses 316. With this configuration, the first insulator 310 and the second insulator 320 come into local contact with each other between the first guide bosses 316 and the second guide bosses 324. This may allow the first insulator 310 and the second insulator 320 to be easily assembled to each other while maintaining flatness thereof.

The second insulator 320 may be formed with positioning holes 326 to set an installation position of the stator 300 when the stator 300 is mounted to the tub 20. In addition, ribs 327 may be formed at the rear surface of the cover 322, to reinforce the second insulator 320.

As is apparent from the above description, according to the embodiments, the motor assures interchangeability of constituent elements thereof even when specifications of the motor are changed. This may reduce costs required to design and produce the elements.

In addition, providing the stator and rotor of the motor with sufficient strength has the effect of preventing deterioration in the performance of the motor due to deformation of the stator and rotor.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A motor usable with a washing machine, the motor comprising:
  a stator mounted to a tub of the washing machine; and
  a rotor to rotate a drum of the washing machine, the stator comprising:
  a stator core;
  a first insulator and a second insulator arranged to cover the stator core;
  a plurality of mounts to couple the stator to the tub, the plurality of mounts being selectively provided at only one of the first insulator and the second insulator; and
  a cover to cover at least a portion of the plurality of mounts and to come into direct contact with the tub when the stator is mounted to the tub, the cover being selectively provided at one of the first insulator and the second insulator at which the plurality of mounts are not provided,
  wherein each of the plurality of mounts includes a fastening member, a coupling boss having a coupling hole configured to receive the fastening member inserted thereinto, a contact surface to come into direct contact with the tub when the stator is mounted to the tub, and a supporting surface formed at an opposite side of the contact surface to support the fastening member,
  wherein the coupling boss is comprised of a single member extending from the contact surface to the supporting surface,
  wherein each mount, including corresponding coupling boss, is spaced apart from other mounts,
  each of the plurality of mounts further includes a sleeve inserted into the coupling hole to reinforce the coupling boss;
  the coupling boss includes a stopper to support one end of the sleeve to prevent the sleeve from protruding out of the coupling boss; and
  the stopper has a stepped portion protruding inward from the coupling boss.

2. The motor according to claim 1, wherein the stopper includes a portion of the contact surface that comes into direct contact with the tub when the stator is mounted to the tub.

3. A washing machine, comprising:
  a tub including a rear wall;
  a drum placed in the tub;
  a motor mounted to the rear wall of the tub and serving to drive the drum,
  wherein the motor includes:
  a stator including an upper insulator arranged adjacent to the rear wall of the tub, a lower insulator arranged at an opposite side of the upper insulator about the tub and having a plurality of mounts extending to the rear wall of the tub in an axial direction of the motor to be coupled to the rear wall of the tub, and a stator core received between the upper insulator and the lower insulator, the upper insulator having a cover to cover at least a portion of the plurality of mounts and to come into direct contact with the tub when the stator is mounted to the tub; and
  a rotor arranged around the stator to electromagnetically interact with the stator, and
  wherein only the lower insulator includes the plurality of mounts; and
  a plurality of fastening members, wherein the plurality of mounts includes a plurality of coupling bosses, each coupling boss having a coupling hole configured to receive a respective one of the fastening members inserted thereinto, a contact surface to come into direct contact with the rear wall of the tub, and a supporting surface formed at an opposite side of the contact surface to support the fastening member,
  wherein each mount, including corresponding coupling boss, is spaced apart from other mounts,
  each of the plurality of mounts further includes a sleeve inserted into the coupling hole to reinforce the coupling boss;
  the coupling boss includes a stopper to support one end of the sleeve to prevent the sleeve from protruding out of the coupling boss; and
  the stopper has a stepped portion protruding inward from the coupling boss.

4. The washing machine according to claim 3, wherein the lower insulator includes:
  a plurality of circular reinforcing ribs arranged respectively at inner and outer sides of the plurality of coupling bosses in a radial direction of the stator; and
  a plurality of guide bosses protruding from one of the reinforcing ribs toward the upper insulator.

* * * * *